2,364,432

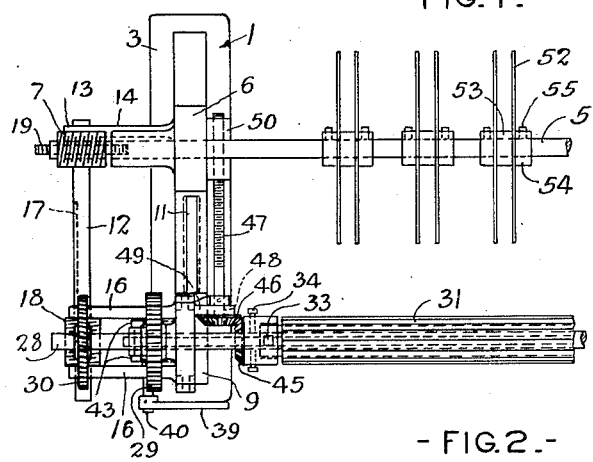
Dec. 5, 1944.   G. B. FARKAS ET AL   2,364,432
FIN-CUTTING MACHINE
Filed April 22, 1943
INVENTORS
George B. Farkas
Addison Y. Gunter
BY S. C. Yeaton
ATTORNEY Patented Dec. 5, 1944

UNITED STATES PATENT OFFICE 2,364,432

FIN-CUTTING MACHINE

George B. Farkas, Jackson Heights, and Addison Y. Gunter, Larchmont, N. Y., assignors to American Locomotive Company, New York, N. Y., a corporation of New York Application April 22, 1943, Serial No. 484,028

5 Claims. (Cl. 90—20)

This invention relates to fin-cutting machines for cutting the fins of a heat exchanger fin-tube, and more particularly to a machine adapted to make two longitudinally spaced cuts in transverse planes through an external circumferential row of longitudinal fins of a fin-tube to thereby provide a circumferential row of short fins separating two circumferential rows of long fins.

The above-described fin-tube, after the cutting operation has been completed, may be acted upon by a fin-twisting machine to twist the short fins obliquely of the long fins, such a fin-twisting machine being described in our co-pending application Serial No. 484,029 filed on even date herewith. The advantages of the fin-tube having a circumferential row of short twisted fins separating two circumferential rows of straight long fins are fully set forth in a co-pending application Serial No. 396,234, filed May 31, 1941.

An object of the present invention is to provide a fin-cutting machine adapted to cut in transverse planes through the longitudinal external fins of a fin-tube.

A further object is to provide a machine as aforesaid, adapted to cut simultaneously in longitudinally spaced transverse planes to thereby provide a circumferential row of short fins separating two circumferential rows of long fins.

Other and further objects of this invention will appear from the following description, the accompanying drawing, and the appended claims.

Referring to the drawing forming a part of this application, Figure 1 is a foreshortened diagrammatic plan view of a fin-cutting machine with a fin-tube assembled therewith; Fig. 2 is a side elevation of the machine of Fig. 1; Fig. 3 is an end view as viewed from the left of Fig. 2; Fig. 4 is an end view as viewed from the right of Fig. 2, a bearing cap being shown in an inoperative position in dot-dash lines; Fig. 5 is a foreshortened view of a fin-tube that has been acted upon by the machine of the present invention; Fig. 6 is an enlarged section on the line VI—VI of Fig. 5; and Fig. 7 is a fragmentary section of a fin-tube taken on the line VII—VII of Fig. 6.

The fin-cutting machine, indicated generally in the drawing by the reference numeral 1, includes a base 2, which may be a part of the machine or may be the support for the machine, such as a table or a shop floor, and end members or pieces 3 and 4 secured to the base. A shaft 5, journalled in bearings 6 formed in the end pieces, extends at one end beyond end piece 3 and has a worm 7 rigidly secured thereon and extends at its other end beyond end piece 4 and has a driving pulley 8 rigidly secured thereon.

Carriage blocks 9 and 10 are slidably mounted in the end pieces 3 and 4 respectively by means of dove-tail connections 11. A transverse shaft 12 is journalled at its rear in a bearing 13 formed in a bracket 14 formed integrally with end piece 3 below shaft 5, and is journalled at its front end in a bearing 15 formed in two transversely spaced brackets 16 formed integrally with block 9. A groove 17 is formed in shaft 12 and a worm 18 is slidably mounted on shaft 12, between brackets 16, and slidably keyed in groove 17 by a tongue (not shown). A worm gear 19 is secured on the rear end of shaft 12 adjacent bracket 14 in mesh with worm 7.

Blocks 9 and 10 have formed therein respectively the lower parts 20 and 21 of bearings 22 and 23, the upper parts being formed respectively by caps 24 and 25. Each cap is connected to its block at one side by a pivot pin 26 and at the other side by a removable lock pin 27, so that on removal of pins 27, the caps can be swung back to inoperative position, as indicated in dot-dash lines in Fig. 4.

A removable shaft 28 is journalled in bearings 22 and 23. It extends at one end beyond bearing 22 and has secured thereon adjacent bearing 22 a gear 29, and at a short distance therefrom a worm gear 30 in mesh with worm 18. Shaft 28 is for rotatably supporting a fin-tube 31. When it is desired to assemble a fin-tube with shaft 28, caps 24 and 25 are swung to open or inoperative position (Fig. 4), shaft 28 is removed from the machine, sleeve chucks 32 are put on the ends of the fin-tube and secured thereto by set screws 33, and the tube and chucks are slipped axially over the gearless end (right end in Fig. 1) of shaft 28 and therealong to the desired position, whereupon the tube is secured to the shaft by set screws 34 also carried by the chucks.

When shaft 28 is in operative position in the machine, with a fin-tube mounted thereon, its gear 29 may be in mesh with a gear 35 slidably mounted by means of a tongue and groove connection 36 on a shaft 37 parallel with shaft 28 and journalled in bearings 38 formed in blocks 9 and 10. Gear 35 may be moved out of engagement with gear 29 by means of lever arm 39, arm 39 being secured to a transverse shaft 40 journalled in bearings 41 formed in brackets 16, and shaft 40 having keyed thereto a lever arm 42, the upper end of which forms a yoke 43 fitting in an annular circumferential groove 44 formed in an extended portion of the hub or gear 35.

Bevel gears 45 are secured on shaft 37 adjacent the inner faces of blocks 9 and 10, each meshing with a bevel gear 46 secured on a transverse screw 47. Each screw 47 is journalled at its front end adjacent its gear 46 in a bearing 48 formed in a bracket 49 extending inwardly from the adjacent block, and is threaded at its rear end and is in threaded engagement with a threaded lug 50 extending inwardly from the adjacent end piece below shaft 5. A handle 51 is secured to the end of shaft 37 outwardly of end piece 4.

Shaft 5 has removably secured thereto a number of pairs of cutting discs 52, the discs of each pair being spaced from each other a short distance by a spacer 53, and the pairs being spaced from each other a long distance. The cutting discs may be rotary saws, grinding wheels, friction discs or of any other type of implement suitable for making cuts in the external fins of a fin-tube. The distance between the discs of a pair may be varied by using different length spacers. The discs have hubs 54, and set screws 55 are employed for securing the discs to the shaft 5. While the discs have been shown mounted in pairs for simultaneously making double cuts to produce the alternate long and short fins, corresponding discs of each pair may be eliminated, if desired, so that first single cuts may be made and thereafter the discs moved axially and the second cuts made.

The operation of the fin-cutting machine is as follows:

Shaft 5 is rotated by means of pulley 8 which may be connected by a belt (not shown) to any suitable source of power such as an electric motor (not shown). Shaft 5 rotates the cutting discs carried thereon and worm 7, which rotates shaft 12 and worm 18 thereon by means of gear 19. Worm 18 rotates gear 30 which rotates shaft 28 and gear 29. The fin-tube is rotated with shaft 28.

If gear 35 is in mesh with gear 29, the rotating fin-tube will be moved transversely toward the rotating cutting discs by means of shaft 37 and screws 47, until the fins are cut through to the desired extent. The lever 39 may be employed by an operator, if desired, to move the gear 35 out of mesh with gear 29 to prevent cutting of the fins beyond the point desired.

If gear 35 is not in mesh with gear 29, then the fin-tube and discs will rotate out of contact with each other. An operator may then manually rotate handle 51 to rotate shaft 37 and screws 47, thereby moving the fin-tube transversely into contact with the cutting discs at any desired speed or retract it from the cutting discs.

Various size tubes may be assembled with shaft 28 by employing various size chucks, and various size cutting discs may be employed if desired, as for instance where a wider or narrower cut is desired.

A fin-tube that has been acted upon by the machine is shown in Fig. 5, the transverse circumferential rows of short fins being indicated by the reference numeral 56 and the transverse circumferential rows of long fins being indicated by the reference numeral 57.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A fin-cutting machine comprising two longitudinally spaced end members; a rotary shaft journalled in said members; blocks supported by said members for inward transverse movement toward said shaft, having aligned bearings transversely spaced from said shaft; a rotary shaft parallel to said first mentioned shaft journallel in said bearings for movement with said blocks, one of said shafts being adapted to be power driven; a longitudinal row of spaced cutting discs secured on one of said shafts, the other of said shafts being adapted for supporting thereon a fin-tube having a circumferential row of spaced external longitudinal strips adapted to be cut into circumferential rows of longitudinal fins; a drive connecting said power-driven shaft with the other of said shafts for rotating said other shaft from said power-driven shaft, said drive permitting said transverse movement simultaneously with rotation of said shafts, whereby said strips and said discs may be brought into strip-cutting engagement to form said fins; and another drive including a shaft geared to one of said parallel shafts for effecting said transverse movement.

2. A fin-cutting machine comprising two longitudinally spaced end members; a rotary shaft journalled in said members; blocks supported by said members for inward transverse movement toward said shaft, having aligned bearings transversely spaced from said shaft; a rotary shaft parallel to said first mentioned shaft journalled in said bearings for movement with said blocks, one of said shafts being adapted to be power driven; a longitudinal row of spaced cutting discs secured on one of said shafts, the other of said shafts being adapted for supporting thereon a fin-tube having a circumferential row of spaced external longitudinal strips adapted to be cut into circumferential rows of longitudinal fins; a drive connecting said power-driven shaft with the other of said shafts for rotating said other shaft from said power-driven shaft, said drive permitting said transverse movement simultaneously with rotation of said shafts, whereby said strips and said discs may be brought into strip-cutting engagement to form said fins; another drive for effecting said transverse movement including a rotary shaft; gears connecting said shaft of said other drive with one of said parallel shafts for rotation thereby in a direction for effecting said inward transverse movement; and manually operated means for releasing said shaft of said other drive.

3. A fin-cutting machine comprising two longitudinally spaced end members; a rotary shaft journalled in said members; blocks supported by said members for transverse movement inward toward and outward from said shaft, having aligned bearings transversely spaced from said shaft; a rotary shaft parallel to said first mentioned shaft journalled in said bearings for transverse movement with said blocks, one of said shafts being adapted to be power driven; a longitudinal row of spaced cutting discs secured on one of said shafts, the other of said shafts being adapted for supporting thereon a fin-tube having a circumferential row of spaced external longitudinal strips adapted to be cut into circumferential rows of longitudinal fins; a drive connecting said power-driven shaft with the other of said shafts for rotating said other shaft from said power-driven shaft, said drive permitting said inward transverse movement simultaneously with rotation of said shafts, whereby said strips and said discs may be brought into strip-cutting engagement to form said fins; another drive for effecting said transverse movements including a rotary shaft; gears connecting said shaft of said other drive with one of said parallel shafts for rotation thereby in a direction for effecting said inward transverse movement; manually operated means for releasing said shaft of said other drive; and hand operated means on said shaft of said other drive for rotating same, when released, in an opposite direction for effecting said outward transverse movement.

4. A fin-cutting machine comprising two longitudinally spaced end members; a rotary shaft journalled in said members; blocks supported by said members for inward transverse movement toward said shaft, having aligned bearings transversely spaced from said shaft; a rotary shaft parallel to said first mentioned shaft journalled in said bearings for movement with said blocks, one of said shafts being adapted to be power driven; a longitudinal row of spaced cutting discs secured on one of said shafts, the other of said shafts being adapted for supporting thereon a fin-tube having a circumferential row of spaced external longitudinal strips adapted to be cut into circumferential rows of longitudinal fins; a drive connecting said power-driven shaft with the other of said shafts for rotating said other shaft from said power-driven shaft, said drive permitting said transverse movement simultaneously with rotation of said shafts, whereby said strips and said discs may be brought into strip-cutting engagement to form said fins; and another drive for effecting said transverse movement including means operatively connected to said members and said blocks, a shaft actuating said operatively connected means, and gears connecting said actuating shaft with one of said parallel shafts for rotation thereby.

5. A fin-cutting machine comprising two longitudinally spaced end members having aligned bearings; a rotary shaft journalled in said bearings; blocks supported by said members for inward transverse movement toward said shaft, having aligned bearings transversely spaced from said shaft; a rotary shaft parallel to said first mentioned shaft journalled in said block bearings for movement with said blocks, one of said shafts being adapted to be power driven; a longitudinal row of spaced cutting discs secured on one of said shafts, the other of said shafts having a free end and having its bearings openable for removal of said other shaft to permit a fin-tube to be mounted thereon and to be removed therefrom at said free end, said fin-tube having a circumferential row of spaced external longitudinal strips adapted to be cut into circumferential rows of longitudinal fins; a drive connecting said power-driven shaft with the other of said shafts for rotating said other shaft from said power-driven shaft, said drive permitting said transverse movement simultaneously with rotation of said shafts, whereby said strips and said discs may be brought into strip-cutting engagement to form said fins; and another drive including a shaft geared to one of said parallel shafts for effecting said transverse movement.

GEORGE B. FARKAS.
ADDISON Y. GUNTER.